(12) United States Patent
Wörner et al.

(10) Patent No.: US 7,127,884 B2
(45) Date of Patent: Oct. 31, 2006

(54) MUFFLER WITH AN INTEGRATED CATALYTIC CONVERTER

(75) Inventors: Siegfried Wörner, Fellbach (DE); Rudolf Buhmann, Esslingen (DE); Marcus Werni, Weinstadt-Schnait (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 29 days.

(21) Appl. No.: 10/996,378

(22) Filed: Nov. 24, 2004

(65) Prior Publication Data

US 2005/0115229 A1    Jun. 2, 2005

(30) Foreign Application Priority Data

Nov. 27, 2003    (DE)   ................................ 103 56 000

(51) Int. Cl.
  *F01N 3/10*    (2006.01)
(52) U.S. Cl. ............................ 60/299; 60/301; 60/322; 60/324; 181/222; 181/231; 181/249; 181/252
(58) Field of Classification Search ................ 60/299, 60/300, 301, 302, 322, 324; 181/210, 222, 181/231, 249, 252, 255, 256
See application file for complete search history.

(56) References Cited

U.S. PATENT DOCUMENTS

| | | | | |
|---|---|---|---|---|
| 4,209,493 A * | 6/1980 | Olson | ........................ | 422/176 |
| 4,579,194 A * | 4/1986 | Shiki et al. | .................. | 181/231 |
| 5,285,640 A * | 2/1994 | Olivo | ........................ | 60/274 |
| 6,444,177 B1 * | 9/2002 | Muller et al. | ................ | 422/177 |
| 6,722,124 B1 * | 4/2004 | Pawson et al. | ............... | 60/286 |
| 6,729,127 B1 * | 5/2004 | Woerner et al. | .............. | 60/297 |

FOREIGN PATENT DOCUMENTS

| | | |
|---|---|---|
| DE | 37 29 477 A1 | 3/1989 |
| DE | 39 40 747 C1 | 7/1990 |
| DE | 42 19 549 A1 | 12/1993 |
| DE | 44 31 484 A1 | 3/1996 |
| DE | 199 52 428 A1 | 5/2001 |
| DE | 102 09 577 A1 | 9/2002 |
| DE | 101 23 360 A1 | 11/2002 |
| EP | 0 816 648 A | 1/1998 |
| WO | WO 02/077425 A | 10/2002 |

\* cited by examiner

*Primary Examiner*—Binh Q. Tran
(74) *Attorney, Agent, or Firm*—Collard & Roe, P.C.

(57) ABSTRACT

A muffler has an integrated SCR catalytic converter for an exhaust line of an internal combustion engine, in particular in a motor vehicle The muffler includes a housing which has an intake trumpet on the intake end and an exhaust pipe on the output end. Catalytic converter elements are arranged in the housing with one inlet end in an inlet chamber and with an outlet end in an outlet chamber. An outlet end of the intake trumpet communicates with the inlet chamber. To improve the efficiency of the SCR catalytic converter the inlet chamber is sealed off from the outside and with respect to the intake trumpet and the catalytic converter elements to the extent that in operation of the internal combustion engine with exhaust gas loaded with urea, passing through the intake trumpet into the inlet chamber, the exhaust gas leaves the inlet chamber only through the catalytic converter elements.

16 Claims, 5 Drawing Sheets

MUFFLER WITH AN INTEGRATED CATALYTIC CONVERTER

CROSS REFERENCE TO RELATED APPLICATIONS

Figure 1:
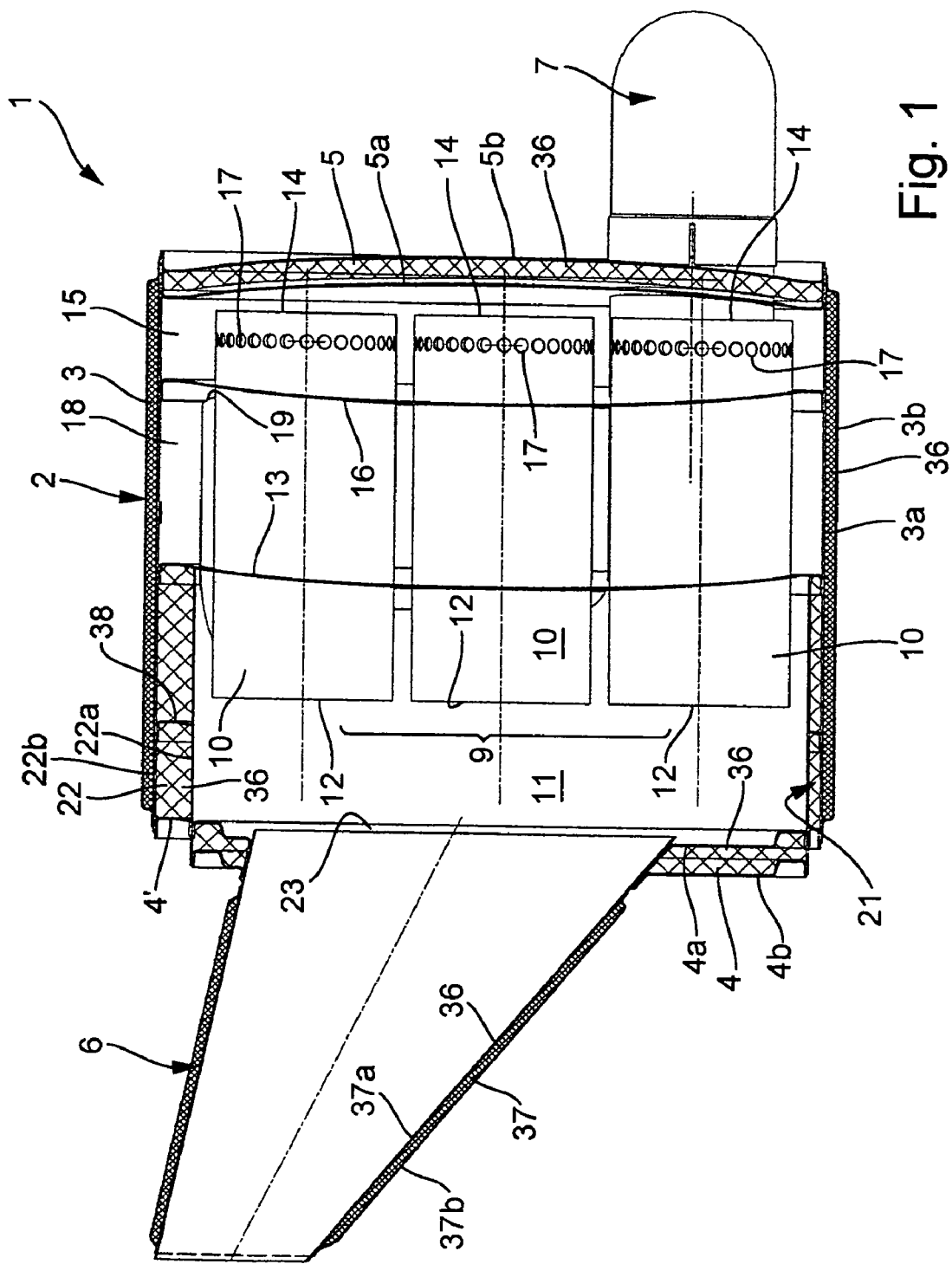

Applicants claim priority under 35 U.S.C. §119 of Germany Application No. DE 103 56 000.9, filed Nov. 27, 2003.

The present invention relates to a muffler having an integrated catalytic converter for an exhaust line of an internal combustion engine, in particular in a motor vehicle.

The exhaust line of an internal combustion engine is usually equipped with at least one muffler to reduce the noise emission by the internal combustion engine through the exhaust line. In addition, usually at least one catalytic converter is provided in the exhaust line of an internal combustion engine to reduce the emissions of pollutants by the internal combustion engine. Frequently very little installation space is available for accommodating the individual components of the exhaust line, especially in motor vehicles. It is fundamentally possible to provide a catalytic converter inside a muffler in a space-saving manner. This may expediently be a catalytic converter which is to be installed additionally in an existing exhaust system, e.g., a so-called SCR catalytic converter. With the help of such an SCR catalytic converter, $NO_x$ components of the exhaust gas can be reduced to $H_2O$ and $N_2$ when urea or ammonia is injected in a regulated manner upstream from the SCR catalytic converter. The present invention relates to the problem of providing an improved design for a muffler of the type defined in the preamble, improving the efficiency of the integrated catalytic converter in particular.

This problem is solved according to this invention by the object of the independent claim. Advantageous embodiments are the object of the dependent claims.

The present invention is based on the general idea of hermitically sealing an inlet chamber into which the exhaust gases that are supplied to the muffler enter and from which the exhaust enters into at least one catalytic converter element. In this way the exhaust gases can leave the inlet chamber only through the at least one catalytic converter element. In particular, this prevents the exhaust from flowing around the at least one catalytic converter element, i.e., bypassing it. Thus through the inventive design, a leakage-free inlet chamber is made available so that the exhaust gas stream necessarily passes through the at least one catalytic converter element. This ensures that the highest possible conversion of pollutants can take place in the at least one catalytic converter element. This greatly improves the efficacy of the catalytic converter integrated into the muffler. The inventive muffler thus differs fundamentally from traditional mufflers in which hermetic sealing of the inlet area is not necessary.

In an advantageous embodiment, the inlet chamber may be designed in an inlet chamber housing which is inserted as a separate component into the housing of the muffler. Such a separate inlet chamber housing can be prefabricated easily and provided with the required imperviousness. This yields a simplified design with an improved sealing effect for the muffler.

Inside the housing, an exhaust pipe leads out of the housing on the outlet side. In a preferred embodiment, this exhaust pipe extends on a different level in the housing than the at least one catalytic converter element. This yields a simplified muffler design because the exhaust pipe may be installed in any position in the level assigned to it, i.e., regardless of the at least one catalytic converter element in the housing. In this way in particular for the exhaust pipe, the great length that is required can be achieved inside the housing, and this is particularly advantageous for a desired sound absorbing effect.

With a traditional muffler, an intake bottom or an outlet bottom is connected to a jacket of the housing by flanging or by individual weld points, but in a preferred embodiment of the present invention, the inlet chamber can be sealed with respect to the housing by soldered and/or welded joints which surround the intake trumpet and/or each catalytic converter element and/or the inlet chamber in a ring. The sealing of the inlet chamber here is achieved by a more complex joining technique, and thus the connection has a double function, however, so that the muffler can be manufactured economically on the whole.

Other important features and advantages of this invention are derived from the subclaims, the drawings and the respective description of the figures on the basis of the drawings.

It is self-evident that the features mentioned above and those yet to be explained below can be used not only in the particular combination given here but also in other combinations or even alone without going beyond the scope of the present invention.

A preferred exemplary embodiment of this invention is illustrated in the drawings and is explained in greater detail in the following description, where the same reference notation refers to the same or functionally same or similar components.

Figure 2:
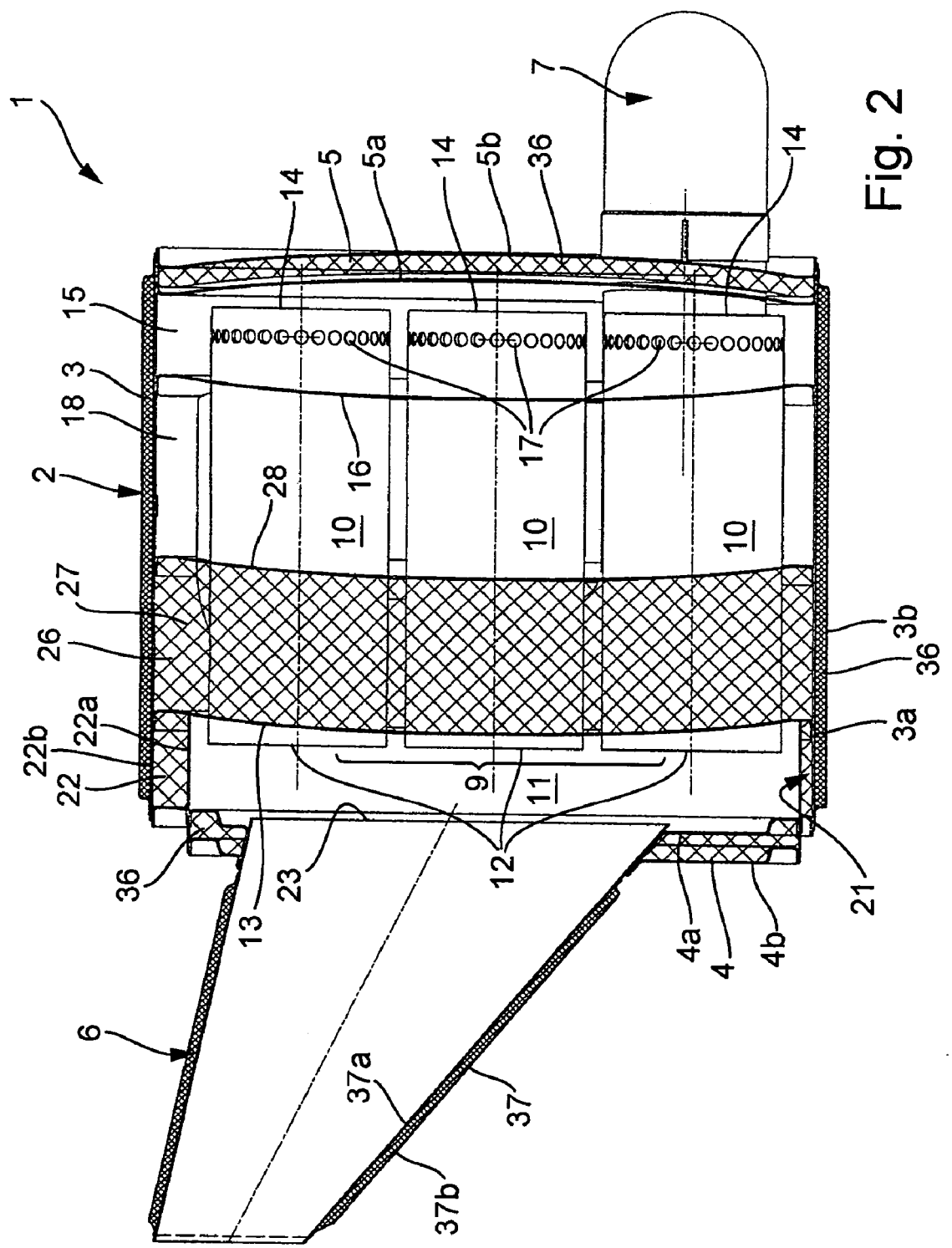
Figure 3:
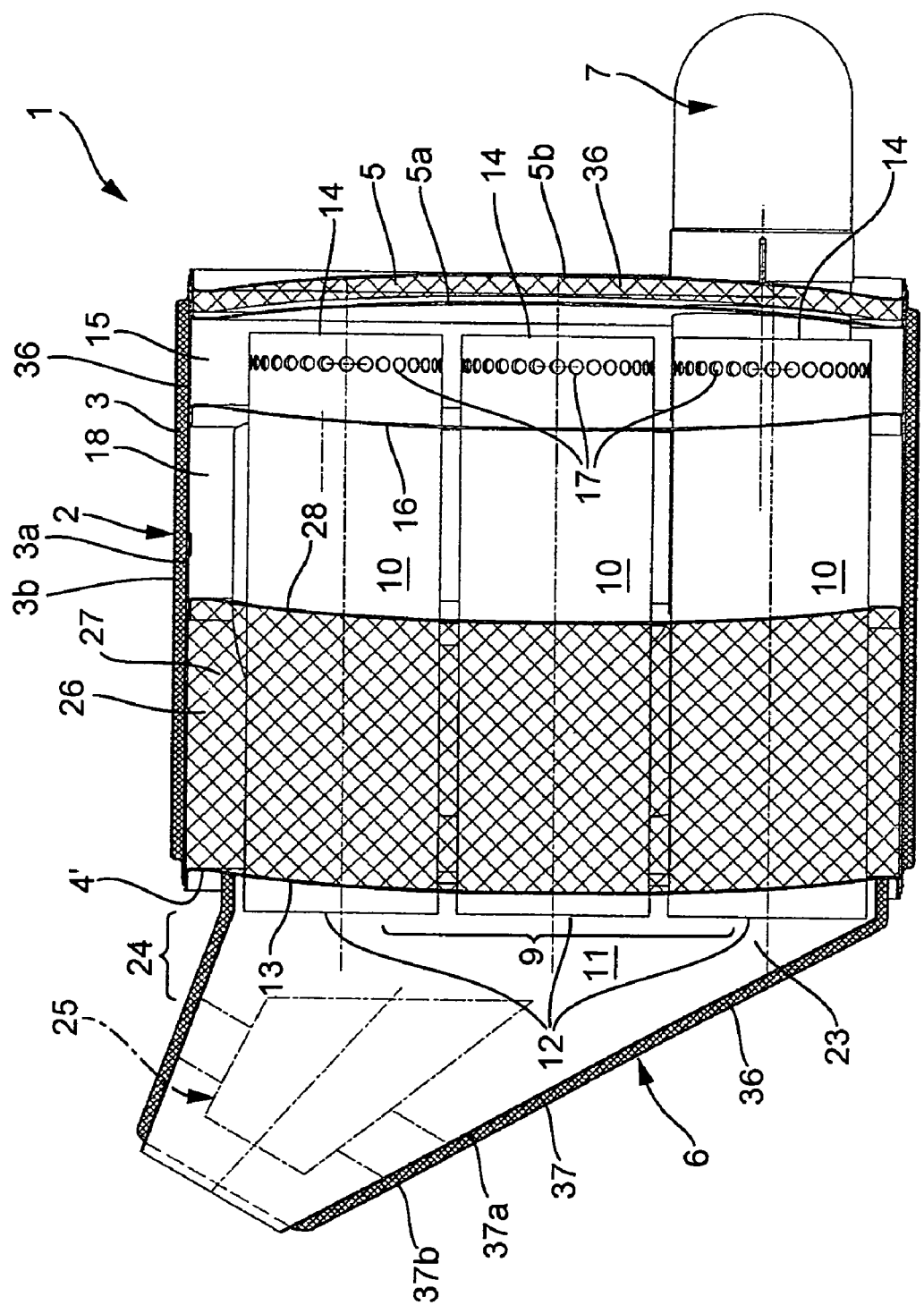
Figure 4:
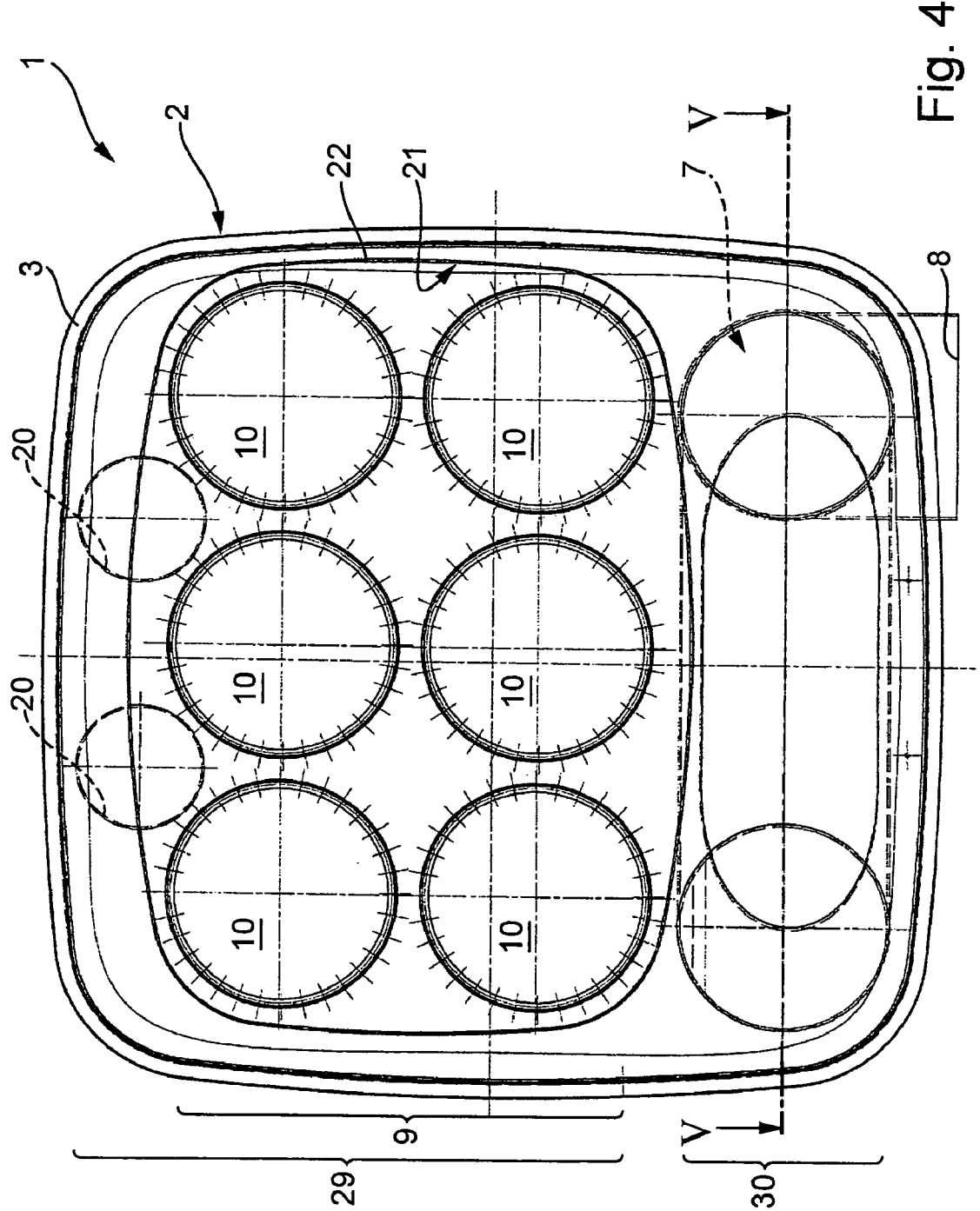
Figure 5:
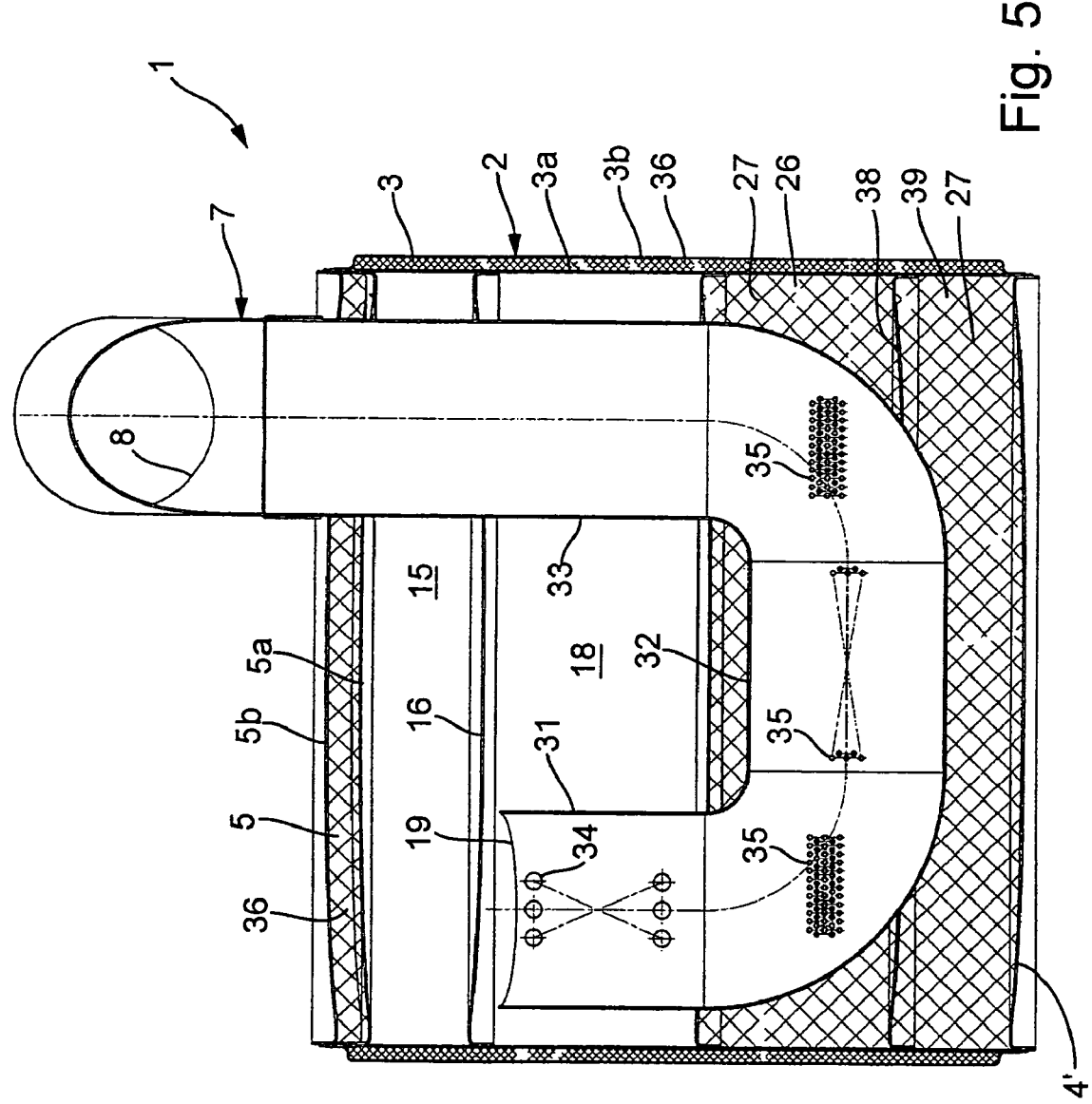

The drawings show schematically:

FIGS. 1–3 a longitudinal section through a muffler according to this invention with different embodiments, FIG. 4 a cross section through the muffler, FIG. 5 a sectional view according to cross-sectional lines V in FIG. 4 of the muffler.

According to FIG. 1, an inventive muffler 1 has a housing 2 with a cylindrical shape in particular. The housing 2 includes a jacket 3 and an intake bottom 4 and an outlet bottom 5. In the area of the intake bottom 4, i.e., on the inlet side, the housing 2 is equipped with an intake trumpet 6 which widens from an exhaust line (not shown) toward the housing 2. In the area of the outlet bottom 5, i.e., at the outlet end, the housing 2 is equipped with an exhaust pipe 7, which may also lead to an exhaust line, or its outlet end 8 (see FIG. 5) may form the exhaust outlet of an exhaust line (not shown) in which the muffler 1 is installed. This exhaust line belongs to an internal combustion engine and carries its exhaust from its combustion chambers into the environment. This internal combustion engine is expediently arranged in a motor vehicle, in particular in a truck.

A catalytic converter 9 is integrated into the muffler 1. To this end, the muffler 1 has at least one catalytic converter element 10 in its housing 2. In the preferred exemplary embodiment shown here, multiple catalytic converter elements 10, namely six in the example shown here, are provided, the entirety forming the catalytic converter 9. Accordingly, the catalytic converter 9 is indicated in the figures with curly brackets. These catalytic converter elements 10 may optionally have a ceramic or metal substrate as the support material.

The catalytic converter elements 10 are arranged in the housing 2 in such a way that the flow passes through them in parallel.

An inlet chamber 11 is designed in the housing 2, directing the exhaust through the intake trumpet 6. The catalytic converter elements 10 are connected to the inlet chamber 11 at their inlet ends 12. In the present case, the catalytic converter elements 10 with their inlet ends 12 puncture through a partition 13 which closes the inlet chamber 11 on a side opposite the intake trumpet 6. The catalytic converter elements 10 pass through this partition 13. This passage through the partition 13 is designed to be airtight and in particular is implemented by a solder connection or a weld connection (not shown here) surrounding the respective catalytic converter element 10 in a closed ring along the partition 13.

Each catalytic converter element 10 opens at its respective outlet end 14 into an outlet chamber 15, which is in turn bordered by the outlet bottom 5 and, opposite it, it is bordered by another partition 16. On their outlet ends 14, each catalytic converter element 10 has a ring-shaped perforation 17. This design has a damping effect on gas pulsations in the outlet chamber 15. It is therefore possible to reduce the structure-borne noise produced on the outlet bottom 5.

Between the two partitions 13 and 16, i.e., between the inlet chamber 11 and the outlet chamber 15, there is a collecting chamber 18 in which an inlet end 19 (see also FIG. 5) of the exhaust pipe 7 is situated. In order for the exhaust gas to go from the outlet chamber 15 into the collecting chamber 18, the partition 16 situated in between is designed to be gas-permeable, in particular having perforations. Additionally or alternatively, this partition 16 may also be equipped with at least one passage 20 (see FIG. 4).

It is essential to this invention that the inlet chamber 11 is designed to be airtight, so that exhaust gas supplied through the intake trumpet 6 can escape from the inlet chamber 11 only by passing through the catalytic converter elements 10. The airtight design of the inlet chamber 11 prevents the exhaust from escaping into the environment of the muffler 1 and prevents it from bypassing the catalytic converter elements 10, i.e., escaping into the collecting chamber 18. Such a hermetically sealed inlet chamber 11 is of particular importance for a preferred application of the muffler 1, namely when the catalytic converter 9 integrated into it is designed as an SCR catalytic converter and serves to convert urea or ammonia, which is introduced into the exhaust line upstream from the muffler 1. Accordingly, SCR catalytic converter elements 10 are used for the embodiment of an SCR catalytic converter 9.

With the help of the additives mentioned above, the $NO_x$ components in the exhaust can be reduced to $H_2O$ and $N_2$ by the SCR technique, i.e., by selective catalytic reaction or reduction. In order for this SCR catalytic converter 9 to function particularly effectively and for the admixed urea and/or ammonia not to enter the environment, the inlet chamber 11 is designed to be leakage-free in this invention. This achieved, for example, by the fact that in the embodiments according to FIGS. 1 and 2, the intake trumpet 6 is connected to the intake bottom 4 by at least one welded or soldered joint (not shown here) which runs around it in a closed ring along the intake bottom 4. In addition, the partition 13, which is situated between the inlet chamber 11 and the collecting chamber 18, is sealed off from the outside in a closed ring running around it.

In the embodiments of FIGS. 1 and 2, the inlet chamber 11 is designed in a separate inlet chamber housing 21 which can also be seen in the cross section according to FIG. 4. This separate inlet chamber housing 21 is thus inserted completely as such into the housing 2 of the muffler 1. The inlet chamber housing 21 also has a jacket 22 and is sealed by the partition 13 on the outlet end. At the inlet end, the inlet chamber housing 21 is sealed by the intake bottom 4, which is connected to the rest of the intake bottom 4' of the housing 2, in particular being inserted into it with a seal.

Thus, an additional intake bottom 4', which is shaped accordingly, is required for sealing the housing 2 on the inlet end. Likewise, an embodiment in which the inlet chamber housing 21 and the housing 2 are sealed by a joint intake bottom and/or in which the inlet chamber housing 21 has its own outlet bottom is also possible.

The inlet chamber housing 21, which is manufactured separately, can thus be prefabricated in a particularly simple manner, so that the desired imperviousness for the inlet chamber 11 can be implemented in a relatively inexpensive manner. The intake trumpet 6 is expediently mounted on this inlet chamber housing 21, so that an outlet end 23 of the intake trumpet 6 opens into the inlet chamber 11.

In contrast with that, in the embodiment according to FIG. 3, the inlet chamber 11 is designed in an end section 24 of the intake trumpet 6 that contains the outlet end 23 of the intake trumpet 6. In other words, the catalytic converter elements 10 extend with their inlet ends 12 to the outlet end 23 of the intake trumpet 6. In particular according to FIG. 3, the intake trumpet 6 may more or less form the intake bottom of the inlet chamber housing 21 or may make it superfluous. In order to nevertheless have the exhaust flow supplied to the catalytic converter elements 10 adequately distributed among the individual catalytic converter elements 10 and/or their flow-through cross sections, a distributor element and/or mixing element 25 (which is represented here with an interrupted line) may optionally be provided in the intake trumpet 6. This distributor element and/or mixing element 25 supports, for example, the widening of the oncoming exhaust flow and permits the most uniform possible oncoming flow to the individual inlet ends 12 of the catalytic converter elements 10. It is clear that such a distributor element and/or mixing element 25 may also be provided in the intake trumpet 6 in the embodiments according to FIGS. 1 and 2.

In the embodiment according to FIG. 1, the inlet chamber 11 is designed with a comparatively large volume, so that a relatively homogeneous mixing and a comparatively uniform distribution of the oncoming exhaust gases among the individual catalytic converter elements 10 can be achieved in the inlet chamber 11.

In contrast with that, with the embodiments according to FIGS. 2 and 3, the inlet chamber 11 may have smaller dimensions. In these embodiments, a damping chamber 26 is additionally provided in the housing 2, with a damping material 27 (indicated by hatching) being arranged in the damping chamber. This damping chamber 26 is situated, for example, between the inlet chamber 11 and the outlet chamber 15 and is also expediently situated between the inlet chamber 11 and the collecting chamber 18. To this end, another partition 28 is provided, dividing the collecting chamber 18 from the damping chamber 26. If an inlet chamber housing 21 is provided—as in the embodiment according to FIG. 2—the damping chamber 26 may also extend to the side of the inlet chamber housing 21 as far as the intake bottom 4' within the damping chamber 26. This is made possible, for example, by a multilayer design of the muffler 2, which is illustrated especially clearly in FIG. 4, where the housing 2 is subdivided into two levels, at least in the area of the inlet chamber housing 21, i.e., it is divided into a catalytic converter level 29 and an exhaust pipe level 30. The catalytic converter 9 and/or its catalytic converter elements 10 are situated in the catalytic converter level 29, whereas the exhaust pipe 7 is arranged in the exhaust pipe level 30. According to FIG. 4, the exhaust pipe 7 thus extends beneath the catalytic converter 9 and/or beneath the catalytic converter elements 10 and thus also extends beneath the inlet chamber housing 21, if such is provided. This design yields a greater freedom in the design and installation of the exhaust pipe 7, so that it may be optimized with regard to its length in particular.

According to FIG. 5, the exhaust pipe 7 extends beginning at its inlet end 19 with a first section 31 in the collecting chamber 18, with a second section 32 in the damping chamber 26 and with a third section 33 again in the collecting chamber 18 and in the outlet chamber 15, from which the exhaust pipe 7 emerges from the housing 2 through the outlet bottom 5 and ends at the outlet end 8. The first section 31 arranged in the collecting chamber 18 and having the inlet end 19 is provided with perforations 32, which are indicated schematically here with a few perforations. These perforations 34 allow exhaust gas to flow out of the collecting chamber 18 and into the exhaust pipe 7 in addition to flowing toward the open inlet end 19. The inlet end 19 is positioned relatively close to the partition 16 between the collecting chamber 18 and the outlet chamber 15, so that a particularly great exhaust pipe length can be achieved, which improves the damping effect of the muffler 1 in the low frequency range.

In addition, the second section 32 of the exhaust pipe 7 which extends in the damping chamber 26 is provided with a perforation 35, which is also indicated by only a few perforations. It is noteworthy here that the perforations 35 of the exhaust pipe 7 in the damping chamber 26 serve not only for gas exchange but also for escape of sound from the exhaust pipe 7 into the damping chamber 26. In this way the airborne sound entrained in the exhaust can penetrate into the damping chamber 26 and into the damping material 27 there, so that effective damping of the airborne sound can be achieved. According to their different functions, the perforations 34 and 35 of the two pipe sections 31 and 32 are designed with different dimensions. The open cross sections of the perforation 34 of the first pipe section 31 within the collecting chamber 18 are thus designed with larger dimensions than those of the perforation 35 of the second pipe section 32 inside the damping chamber 26.

In addition, the inventive muffler 1 also has a reduced structure-borne noise emission to the outside and an improved heat balance. This is achieved through a double-wall design of the housing 2. In particular, the jacket 3 is designed with a double wall, i.e., with two individual walls 3a and 3b, with an insulation insert 36 arranged between the individual walls 3a, 3b. This insulation insert 36 serves mainly to provide thermal insulation and may also be designed to have a sound-absorbing effect. By analogy with that, the intake bottom 4 is designed with a double wall, i.e., with two individual walls 4a and 4b. A corresponding insulation insert 36 is also provided between the individual walls 4a and 4b of the intake bottom 4. The outlet bottom 5 is similarly also designed with a double wall, so that a corresponding insulation insert 36 can also be introduced between the individual walls 5a and 5b of the outlet bottom 5. According to FIGS. 1 and 2, the jacket 22 of the inlet chamber housing 21 is also designed with double walls. Then again, there is a corresponding insulation insert 36 between the individual walls 22a and 22b of the jacket 22. According to FIGS. 1 through 3, the intake trumpet 6 is also designed with double walls, so that a jacket 37 of the intake trumpet 6 again holds a suitable insulation insert 36 between its individual walls 37a and 37b.

According to FIGS. 1 and 5, the housing 2 may also contain an additional chamber 39, which is separated from the adjacent damping chamber 26 by an additional partition 38, in addition to the inlet chamber housing 21, i.e., essentially in the exhaust pipe level 30. This additional chamber 39 may be an additional damping chamber which may be filled with damping material 27 accordingly. The partition 38 may be perforated. This serves essentially to secure the position of the exhaust pipe 7 and the inlet chamber 21 in the housing 2.

The inventive muffler 1 with the integrated catalytic converter 9 functions as follows:

During operation of the internal combustion engine, the exhaust gases flow through the intake trumpet 6 into the inlet chamber 11. The exhaust gases may be enriched with urea or ammonia in a preferred application. In the inlet chamber 11, the exhaust gases are distributed as uniformly as possible among the inlet ends 12 of the catalytic converter elements 10. Since the inlet chamber 11 according to this invention is designed to be leakage-free, there is no other possibility for the exhaust gases to leave the inlet chamber 11. Thus, all the exhaust gases flow through the catalytic converter elements 10.

The exhaust gases enter the outlet chamber 15 through the catalytic converter elements 10. From the outlet chamber 15, the exhaust gases pass through the partition 16 into the collecting chamber 18. From the collecting chamber 18, the exhaust gases go through the inlet end 19 and through the perforation 34 into the exhaust pipe 7. The exhaust gases are removed from the housing 2 through the exhaust pipe 7. The perforation 35 within the damping chamber 26 allow the sound to be transferred into the damping material 27, so that higher interference frequencies in particular are absorbed.

The invention claimed is:

1. A muffler having an integrated catalytic converter for an exhaust line of an internal combustion engine comprising:
   (a) a housing having an input end, an output end, an intake trumpet on the input end, and an exhaust pipe on the output end, said intake trumpet having an intake trumpet outlet end;
   (b) an inlet chamber housing inserted as a separate component into the housing comprising an inlet chamber communicating with said intake trumpet outlet end; and
   (c) at least two catalytic converter elements arranged in the housing having parallel flow through said at least two catalytic converter elements, each catalytic converter element comprising one catalytic converter element inlet end in the inlet chamber and one catalytic converter element outlet end in an outlet chamber, said inlet chamber being sealed off from the outside and from the intake trumpet and said at least two catalytic converter elements to the extent that during operation of the internal combustion engine, exhaust gas entering the inlet chamber through the intake trumpet leaves the inlet chamber only through said at least two catalytic converter elements.

2. The muffler according to claim 1, wherein the outlet chamber communicates through a partition with a collecting chamber, wherein the exhaust pipe has an exhaust pipe inlet end communicating with the collecting chamber.

3. The muffler according to claim 2, wherein the partition is perforated or contains at least one opening between the outlet chamber and the collecting chamber.

4. The muffler according to claim 3, wherein the partition is perforated and contains at least one opening between the outlet chamber and the collecting chamber.

5. The muffler according to claim 2, wherein the collecting chamber is arranged between the inlet chamber and the outlet chamber.

6. The muffler according to claim 2, wherein
the exhaust pipe inlet end is positioned just in front of the partition between the outlet chamber and the collecting chamber, and
the exhaust pipe inside the collecting chamber is perforated.

7. The muffler according claim 1, wherein a distributor element or a mixing element is arranged in the intake trumpet and distributes the incoming gas among the catalytic converter element inlet ends of the at least two catalytic converter elements.

8. The muffler according to claim 1, wherein each catalytic converter element has a ring-shaped perforation on its catalytic converter element outlet end.

9. The muffler according to claim 1, wherein
a damping chamber that contains damping material is situated in the housing, and
a perforated section of the exhaust pipe extends inside the damping chamber.

10. The muffler according to claim 9, wherein at least a portion of the damping chamber is arranged between the collecting chamber and the inlet chamber.

11. The muffler according to claim 9, wherein the exhaust pipe has perforations in the collecting chamber and in the damping chamber and the perforation of the exhaust pipe in the collecting chamber has a larger open cross section than the perforation of the exhaust pipe in the damping chamber.

12. The muffler according to claim 1, wherein the exhaust pipe extends inside a different level in the housing than the at least one two catalytic converter elements.

13. The muffler according to claim 1, wherein each of the at least one two catalytic converter elements is an SCR catalytic converter element.

14. The muffler according to claim 1, wherein the intake trumpet or the housing or the inlet chamber housing or an intake bottom of the housing through which the intake trumpet passes or an outlet bottom of the housing through which the exhaust pipe passes are designed as a double wall with an insulation insert.

15. The muffler according to claim 1, wherein the inlet chamber is sealed by soldered connections or by welded connections which surround the intake trumpet or each catalytic converter element or the inlet chamber with respect to the housing in a ring shape.

16. A muffler having an integrated catalytic converter for an exhaust line of an internal combustion engine comprising:
(a) a housing having an input end, an output end, an intake trumpet on the input end, and an exhaust pipe on the output end, said intake trumpet having a section containing an intake trumpet outlet end and forming an inlet chamber communicating with said intake trumpet outlet end; and
(b) at least two catalytic converter elements arranged in the housing having parallel flow through said at least two catalytic converter elements, each catalytic converter element comprising one catalytic converter element inlet end in the inlet chamber and one catalytic converter element outlet end in an outlet chamber, said inlet chamber being sealed off from the outside and from the intake trumpet and said at least two catalytic converter elements to the extent that during operation of the internal combustion engine, exhaust gas entering the inlet chamber through the intake trumpet leaves the inlet chamber only through said at least two catalytic converter elements.

* * * * *